United States Patent [19]
Roeder et al.

[11] Patent Number: 5,238,419
[45] Date of Patent: Aug. 24, 1993

[54] AIRBAG CONNECTING DEVICE

[75] Inventors: Juergen Roeder, Darmstadt; Hans Dieter Pfeifer, Lautertal; Brigitte Neumann, Lange, all of Fed. Rep. of Germany

[73] Assignee: Thomas & Betts Corporation, Bridgewater, N.J.

[21] Appl. No.: 662,531

[22] Filed: Feb. 28, 1991

[30] Foreign Application Priority Data

Mar. 2, 1990 [DE] Fed. Rep. of Germany ....... 4031235

[51] Int. Cl.$^5$ .............................................. H01R 35/04
[52] U.S. Cl. .................................... 439/164; 439/15; 439/447
[58] Field of Search ............... 439/15, 164, 445, 447, 439/452

[56] References Cited

U.S. PATENT DOCUMENTS

| | | |
|---|---|---|
| 1,668,953 | 5/1928 | Erickson . |
| 3,525,536 | 8/1970 | Pruniski ........................ 286/150 |
| 3,800,068 | 3/1974 | Torgerson ..................... 439/447 |
| 3,818,122 | 6/1974 | Luetzow ........................ 174/86 |
| 4,290,664 | 9/1981 | Davis et al. .................... 439/638 |
| 4,657,326 | 4/1987 | Zeller et al. ................... 339/3 |
| 4,696,523 | 9/1987 | Schauer et al. ................ 439/11 |
| 4,722,690 | 2/1988 | Priede ........................... 439/15 |
| 4,744,763 | 5/1988 | Suzuki et al. .................. 439/15 |
| 4,798,544 | 1/1989 | Hartman ........................ 439/606 |
| 4,813,878 | 3/1989 | Schauer ......................... 439/16 |
| 4,824,396 | 4/1989 | Sasaki et al. ................... 439/475 |
| 4,838,803 | 6/1989 | Kondo ........................... 439/164 |
| 4,844,359 | 7/1989 | Kato .............................. 439/15 |
| 4,927,365 | 5/1990 | Schauer et al. ................ 439/15 |
| 4,930,716 | 6/1990 | Bannai ........................... 242/85 |
| 4,943,240 | 7/1990 | Karlsson ........................ 439/15 |
| 5,032,084 | 7/1991 | Schauer ......................... 439/15 |
| 5,059,134 | 10/1991 | Schauer et al. ................ 439/164 |

Primary Examiner—Gary F. Paumen
Attorney, Agent, or Firm—Robert M. Rdorick; Salvatore J. Abbruzzese

[57] ABSTRACT

An electrical connector for coupling a stationary connection to a connection which rotates therearound includes a housing and flat conductor cable. The housing includes a housing bottom and a housing cover. The flat conductor cable is wound into a spiral and is supported in the housing. The flat conductor cable further includes bent ends which extend from the spiral at 90°. An outer protective sheathing covers the bent ends of the cable as well as a portion of the spiral.

6 Claims, 3 Drawing Sheets

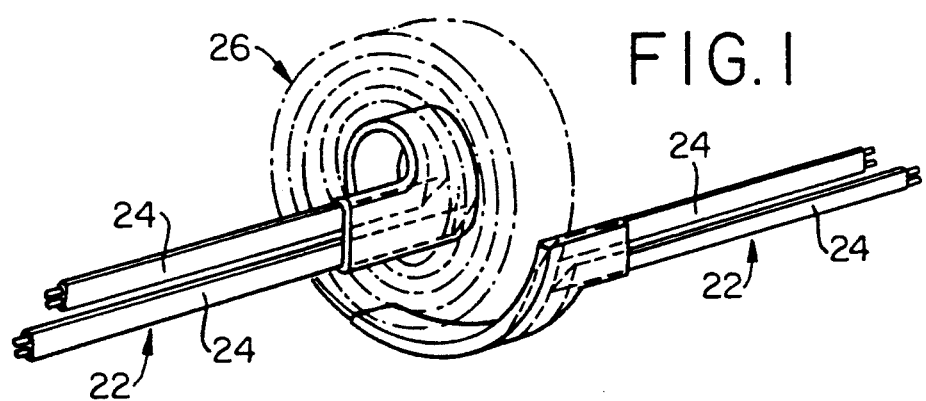
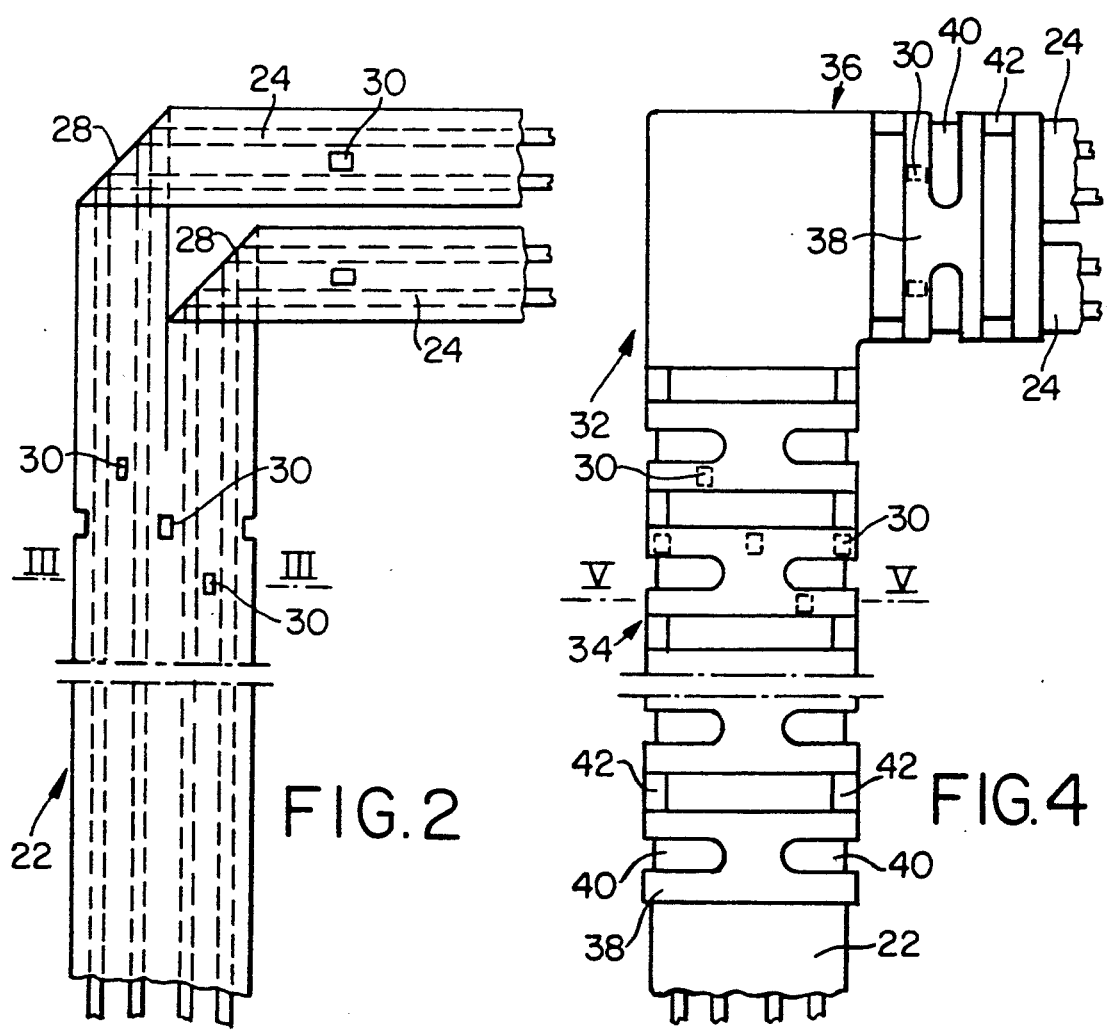
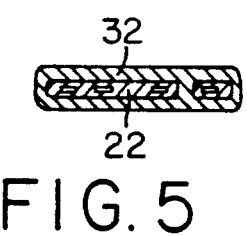
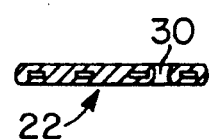

AIRBAG CONNECTING DEVICE

FIELD OF THE INVENTION

The invention concerns a connecting device for connecting a stationary current connection to a current connection rotating therearound, with a housing comprising a housing bottom and a housing cover which is rotatable therearound, and with a flat conductor cable which is wound as a spiral and which at the ends of the spiral is bent over forming ends which extend away at 90°, wherein the spiral is disposed in the housing and the ends which are bent over at 90° issue from the housing, and with openings in the flat conductor cable.

BACKGROUND OF THE INVENTION

A connecting device of that kind is known (U.S. Pat. No. 4,824,396). Connecting devices of that kind are used for example in the hubs of the steering wheels of motor vehicles. Increasingly, disposed in motor vehicle steering wheel hubs is a buffer gas bag which is inflated in fractions of a second in the event of substantial deceleration. That is effected by means of a firing capsule which is operative as a gas generator. The buffer gas bag and the firing capsule turn with the steering wheel. The steering column, through which the current for the firing capsule is supplied, is stationary. Now, the known connecting device just referred to above connects the rotating current connection of the firing capsule to the stationary current connection in the steering column. The spiral which is wound from the flat conductor cable is wound in a loose configuration with large clearance and spaces between the individual turns of the spiral. When the steering wheel is turned in one direction the spiral is further wound up and the windings are tightened towards each other. When the steering wheel is turned in the other direction, the spiral is unwound and the turns move away from each other to a certain extent. In that way the two current connections are always connected together in the same manner by way of the conductors of the flat conductor cable, even upon a rotary movement of the steering wheel. In addition to the firing capsule, it is also possible to envisage connection further current consumers or switches disposed in the steering wheel to a stationary current connection.

In order to achieve a high degree of elasticity, in order to provide for a low weight and in order to reduce the level of costs, a connecting device of the specified kind uses a flat conductor cable of small conductor cross-sections That means however that the mechanical strength thereof is reduced During the service life of a motor vehicle, the steering wheel thereof will be turned backwards and forwards innumerable times. That means that the flat conductor cable and in particular the ends thereof which issue from the housing are subjected to mechanical loadings.

SUMMARY OF THE INVENTION

The invention is based on the object of so designing a connecting device of the specified kind that the flat conductor cable and in particular the ends thereof which issue from the housing are mechanically protected. The invention further seeks to provide that the connecting device is of such a configuration that the flat conductor cable, with its spiral and its two ends which extend away at 90°, can be connected to the housing easily, quickly and inexpensively. In that regard the invention seeks to provide that the desired high mechanical strength is maintained.

To attain that object, in a connecting device of the kind set forth in the opening part of this specification, the invention provides that in the transitional regions between the spiral and the two ends which extend away at 90°, the flat conductor cable is enclosed in a respective sheathing, the sheathings have portions embracing the ends of the spiral and the ends which extend away at 90°, and the portions embracing the ends of the spiral are located to the housing bottom and the housing cover. The spiral which is disposed in the housing is subjected to scarcely any mechanical loading. It is only wound up tighter and unwound. The flat conductor cable can readily withstand that loading, by virtue of its elasticity. The flat conductor cable is subjected to a severe mechanical loading at its ends and in particular at its end which is disposed in the rotatable housing cover. At those ends or in the transitional regions between those ends and the spiral, the flat conductor cable is further connected to the housing bottom and the housing cover. At those endangered locations, in accordance with the invention, the flat conductor cable is mechanically stabilized and protected by the sheathings. The sheathings then also present themselves for connecting the two ends of the spiral to the housing bottom and the housing cover. That is effected with the locating arrangement according to the invention. The locating action can be produced in a very simple manner. In other words, the flat conductor cable or the spiral wound therefrom, with the two ends extending away at 90°, can be very quickly and easily fixed in the housing.

In an advantageous embodiment, the invention provides that the sheathings are injected onto the flat conductor cable and the plastic material forming them is caused to flow into the openings provided in the sheathing of the cable, forming a means for relieving a pulling force thereon. The openings provided in the sheathing of the flat conductor cable increase the elasticity thereof. In accordance with the invention the sheathings can be anchored in the openings in the flat conductor cable. In that way the sheathings are firmly connected to the flat conductor cable. The cable is mechanically stabilized and relieved of the load of pulling forces thereon.

So that said sheathings do not adversely affect the flexibility of the flat conductor cable, a further configuration of the invention provides that the portions forming them have annular portions which are separated by openings, and limb portions connecting said annular portions. The annular portions which are separated by openings and which are connected by limb portions have almost the same degree of flexibility as the flat conductor cable itself. The above-mentioned portions embrace the ends of the spiral and the ends thereof which extend away at 90°. Accordingly, the portions forming a sheathing also define an angle of 90°.

The enhanced flexibility of the sheathings is not required everywhere. It is sufficient for the sheathings to be particularly flexible only over the ends of the flat conductor cable, which extend away from the spiral. For that purpose the invention provides that the portion forming the sheathings has said annular portions which are separated by openings, and the limb portions connecting the annular portions, only in the region leading from the spiral to the ends of the flat conductor cable which extend away therefrom. It is further sufficient for those portions which afford the increased degree of flexibility to begin only at a spacing from the spiral.

The housing comprises a housing bottom and a housing cover. In regard to the configuration of the housing cover and the location of the one sheathing to said cover, the invention provides that the housing cover has a cover plate, a hub in the form of a tubular portion, and an outer casing portion, and the hub has an opening which is delimited by two sides and the portion of the one sheathing is located in the opening. In terms of the principle of the invention, the way in which the one sheathing is located in the opening is immaterial. It is particularly expedient for the portion of the one sheathing to have a thickened portion and for the latter to be located between the two sides. It may simply be clamped in position between them. To provide for further mechanical stabilization and also to afford mechanical protection for the end of the spiral, a further configuration provides that said portion, adjoining the thickened portion, has a further portion which bears against he outside surface of the hub. That means that the sheathing also embraces the spiral in the initial portion thereof, and mechanically stabilizes same. Likewise the thickened portion is better held in the opening between the two sides thereof. It cannot slip away radially inwardly as it is resisted by the portion which bears against the outside surface of the hub. In regard to the configuration of the housing bottom and the location of the sheathing provided at the other end of the spiral, the invention provides that the housing bottom has a bottom plate and an inner casing portion and the latter has an opening and the portion of the one sheathing is located in the opening. In regard also to this locating action, the way in which the locating effect is specifically produced is immaterial in terms of the principle of the invention. It has been found to be particularly advantageous for the portion to have a thickened portion and for the latter to be located in the opening. A particularly good locating effect is achieved if the sides defining the opening have a tongue and a groove and the thickened portion has a groove and a tongue which can be engaged with them. In a particularly advantageous configuration the portion of the sheathing provided at said end of the spiral, adjoining the thickened portion, has a further portion which bears against the inside surface of the inner casing portion. That arrangement also provides for mechanical stabilization of the spiral in the end portion thereof.

The firing capsule forming the gas generator for the buffer gas bag is connected to its voltage source or firing device by the connecting device. Likewise switches or contacts for actuating the horn or hooter, for actuating the headlamps, for actuating measuring devices and the like may be connected in that way. Flat conductor cables with more than two conductors are used for that purpose. In order to facilitate the connection of a plurality of current consumers or switches, in a further embodiment the invention provides that the flat conductor cable is slit in its longitudinal direction at its ends which issue from the housing, forming at least two conductor portions. That arrangement provides two or more conductor portions which can be taken separately from each other in different directions and connected to current consumers or switches. The same purpose is served by a further feature according to the invention which provides that the portions of the sheathings, which issue from the housing, are bent over with respect to the center line of the housing. Generally the portions embracing the conductor portions are bent over outwardly. That is due to the fact that there is space there for the conductor portions. In other words the conductor portions of the flat conductor cable are also guided a short distance outside of the housing and thus mechanically stabilized. That also enhances the service life of the entire connecting device.

It is stated hereinbefore that the housing cover is rotatable and the housing bottom is thus stationary. Likewise reference was made to a beginning and an end portion of the spiral. Those terms are relative. It would likewise be possible to say that the housing cover is stationary and the housing bottom is rotatable about the cover. The terms beginning and end portions of the spiral can also be interchanged.

BRIEF DESCRIPTION OF THE DRAWINGS

FIG. 1 is a perspective view of the spiral and the two ends which extend away therefrom at 90°.

FIG. 2 is a plan view of a beginning or end portion of the spiral and two conductor portions which extend away therefrom at 90°.

FIG. 3 is a view in cross-section through the flat conductor cable taken along section line III—III in FIG. 2.

FIG. 4 is a plan view similar to that shown in FIG. 2 but with a sheathing fitted onto the conductor portions of the flat conductor cable.

FIG. 5 is a view in section taken along section line V—V in FIG. 4.

DETAILED DESCRIPTION OF THE PREFERRED EMBODIMENT

Figure 6:
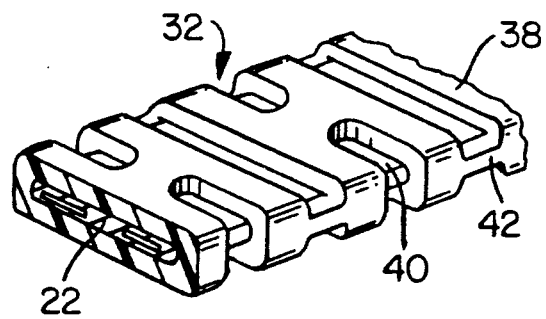
FIG. 6 is a perspective view of a part of said sheathing.

FIG. 1 shows a four-wire flat conductor cable 22 with its two ends each divided into two conductor portions 24. In its middle region the flat conductor cable 22 is wound to form a spiral 26. In its middle region the flat conductor cable 22 is wound to form a spiral 26. The conductor portions 24 extend in planes which define an angle of 90° to the spiral 26. In accordance with the view shown in FIG. 2, that is due to the fact that the conductor portions 24 are bent over through 90° along fold lines 28 relative to the two ends of the spiral 22. Cable openings 30, such as shown in FIG. 3, are provided over the entire width and also at the edges of the insulation of the flat conductor cable 22.

FIGS. 4 and 5 show the sheathing 32 which is injected from plastic material and which embraces the two ends of the spiral 26 and a part of the conductor portions 24 which extend away therefrom. The sheathing 32 which is provided in duplicate, comprises two sheathing portions 34 and 36. They include an angle of 90° to each other. As FIG. 6 in particular shows, the sheathing 32, at its end which is at top right in FIG. 4, has annular portions 38, sheathing openings 40 separating the annular portions, and limb portions 42 connecting same. As FIG. 4 shows, only the end of the portion 36 of the sheathing 32, which is at top right, is of that configuration. That portion 36 embraces the conductor portions 24 which extend away from the spiral 26. At a spacing from the spiral 26 which is not shown in FIG. 4, or the portion 34 which leads to the spiral, the sheathing 32 has the annular portions 38 with the sheathing openings 40 and the limb portions 42, which enhance the flexibility thereof. It is only there that the conductor portions must retain their high degree of flexibility for the purposes of connection to the stationary current connection. That high level of flexibility is not required in the portion 34 which leads to the spiral 26. For the purposes of simplifying the illustration, that configuration of the sheathing with the annular portions 38, the sheathing openings 40 and the limb portions 42 are not illustrated in FIGS. 7 through 11.

Figure 7:
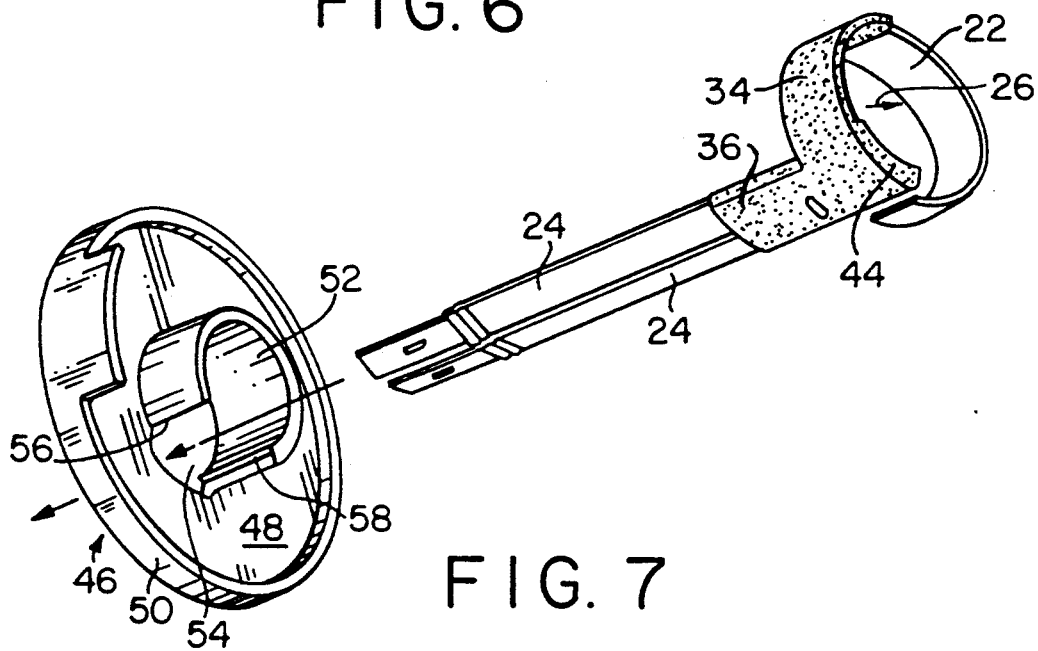
FIG. 7 is an exploded perspective view of the housing cover and the beginning portion of the spiral with the sheathing embracing same.
Figure 8:
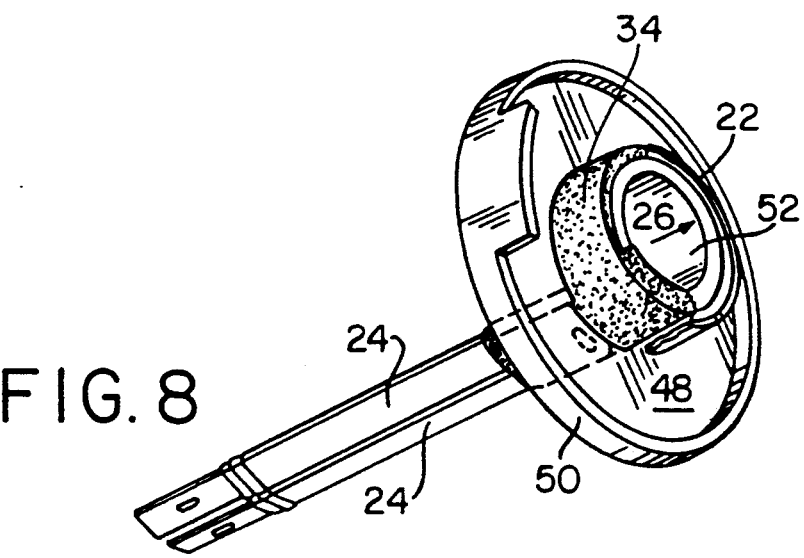
FIG. 8 is a perspective view of the housing cover and the sheathing located thereto.

In the view shown in FIG. 7, the sheathing has a thickened portion 44 between its two portions 34 and 36. FIG. 7 further shows the housing cover 46 with the cover plate 48, the outer casing portion 50, the hub 52 with the hub opening 54 and the two sides 56 and 58 defining the hub opening 54. The housing cover 46 is a known self-contained component. The two conductor portions 24 together with the spiral 26 are pushed into the central aperture of the hub 52, in the direction of the arrows shown in FIG. 7. That gives the configuration shown in FIG. 8. The thickened portion 44 lies in the hub opening 54 between the two sides 56 and 58. In that case the side 58 may have a groove and the thickened portion 54 may have a projection. That is indicated in FIGS. 7 and 8. Irrespective of the detailed construction, however, the thickened portion 44 is clamped in position in the hub opening 54. In that arrangement the portion 34 of the injected sheathing lies with a further portion 80 against the outside surface of the hub 52.

Figure 9:
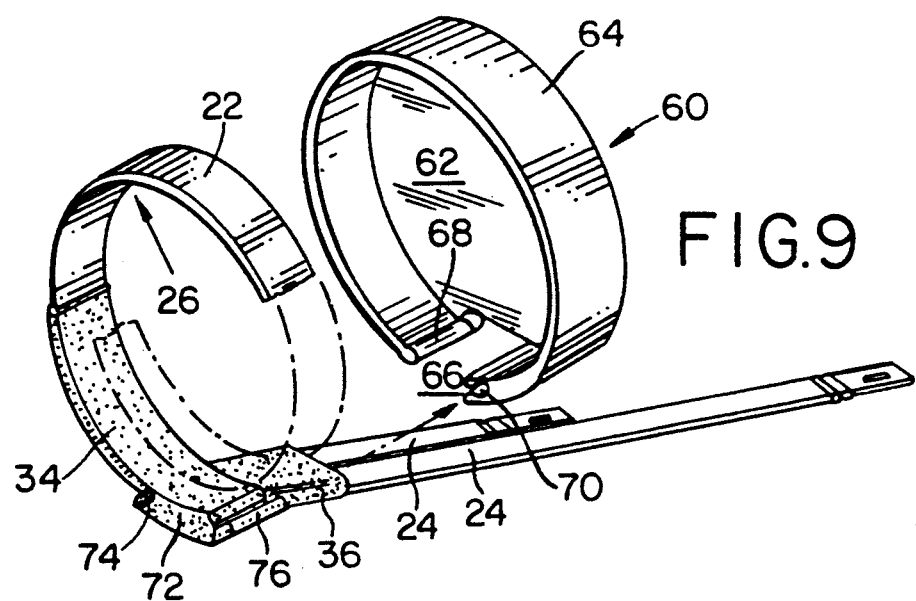
FIG. 9 is an exploded perspective view of the housing bottom and the end portion of the spiral with the sheathing embracing same.

As shown is FIG. 9 the housing bottom 60 has a bottom plate 62 and an inner casing portion 64. A plate opening 66 is provided in the latter. A tongue 68 and a groove 70 are provided in the sides of the inner casing portion 64, which define the plate opening 66. The portion 34 of the sheathing which embraces the end portion of the spiral 26 in turn has a thickened portion 72. A groove 74 and a tongue 76 are also arranged at the sides thereof. For the purposes of assembly, the thickened portion 72 together with the spiral 26 is moved towards the housing bottom 60 in the direction of the arrow indicated in FIG. 9. When that happens the tongue 68 is pushed into the groove 74 and the tongue 76 is pushed into the groove 70, resulting in the configuration shown in FIG. 10. The portion 34 bears against the inside surface of the inner casing portion (64) with a portion 82 adjoining the thickened portion 72. The spiral 26 is now firmly located or connected to the housing bottom 60.

Figure 10:
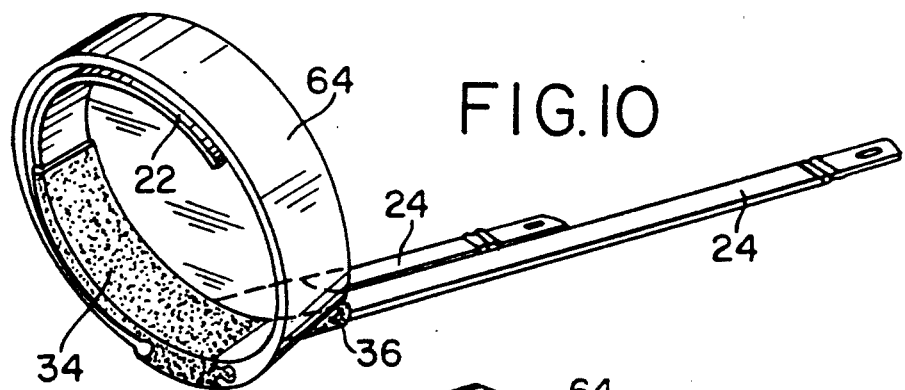
FIG. 10 is a perspective view of the housing bottom and the sheathing located thereto.

FIGS. 9 and 10 further clearly show that the portion 36 is bent over outwardly relative to the portion 34. The conductor portions 24 are also bent over outwardly in a corresponding fashion. Generally speaking, there is more space in the direction in which the conductor portions 24 then extend, than directly beside the housing bottom 60. Attention has already been directed to the advantage deriving therefrom.

Figure 11:
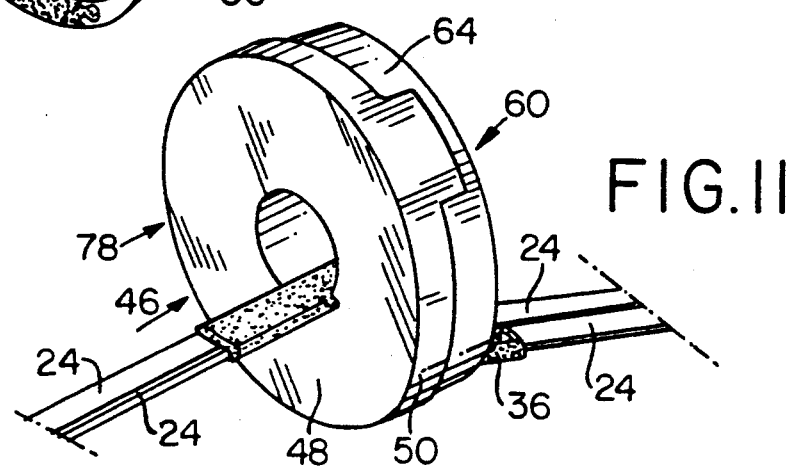
FIG. 11 is a perspective view of the housing composed of the housing bottom and the housing cover.

After the assembly operation, as shown in FIGS. 7 and 9, the configuration is as illustrated in FIG. 11. FIG. 11 shows the housing 78 of the connecting device which is now finished, consisting of the housing bottom 60 and the housing cover 46.

I claim:

1. An electrical cable assembly for use in a connector for electrically coupling a stationary connection to a movable connection which is rotatable with respect to the stationary connection, said cable assembly comprising:

an elongate flat able having plural elongate, transversely spaced conductors supported by a cable insulator, said flat able having opposed ends for electrical connection to said stationary connection and to said movable connection, and a central region therebetween which provides for relative movement between said ends, said opposed cable ends extending from said central region at opposed 90° angles therefrom thereby defining a bent transition portion between said central region and each said end; and a protective sheathing formed over a portion of each of said ends of said flat cable, adjacent portions of said central region and said bent transition portions, said sheathing including a series of longitudinally spaced annular portions along said cable ends and said central region adjacent said bent transition portions and a solid portion at said bent transition portions, adjacent annular portions being separated by an opening which provides for longitudinal flexing of said flat able at said ends, and along said central region while preventing flexing at said bent transition portions.

2. An electrical cable assembly of claim 1 wherein said adjacent annular portions are joined by a limb portion which longitudinally spans said opening.

3. An electrical cable assembly of claim 2 wherein said flat cable includes opposed flat planar surfaces and opposed edge surfaces and wherein said limb portion joining at least two adjacent annular portions lies along one said edge surface.

4. An electrical cable assembly of claim 1 wherein said cable central region is wound in a spiral.

5. An electrical connector for coupling a pair of relatively movable connectors, said connector comprising:

a housing including a base positioned adjacent one of said pair of connectors and a cover positioned adjacent the other connector of said pair, said cover being rotatable with respect to said base;

an elongate flat cable supported by said housing between said base and said cover, said cable including plural elongate transversely spaced conductors within a cable insulator, said cable having a central region wound in a spiral and oppositely directed first and second ends including bent portions which extend from said spiral at 90°, said first and second ends extending respectively from said cover and said base; and an insulative protective sheathing formed about said cable, said sheathing covering said bent portions of said ends and adjacent portions of said spiral, said sheathing including a thickened portion adjacent at least one of said bent portions;

said base having an opening therethrough permitting passage of said at least one bent portion, said opening being defined by spaced side edges of said base and wherein said side edges of said base and said thickened portion of said one bent portion engage each other in a tongue and groove relationship to secure said thickened portion to said base.

6. An electrical connection of claim 5 wherein said thickened portion of said at least one bent portion includes spaced tongue and groove elements and wherein said side edges of said thickened portion include complimentary spaced tongue and groove portions for supporting said thickened portion between said side edges of said base.

* * * * *